(12) United States Patent
Lee et al.

(10) Patent No.: US 11,532,960 B2
(45) Date of Patent: Dec. 20, 2022

(54) DEVICE FOR MANUFACTURING ROTOR CORE, METHOD FOR MANUFACTURING ROTOR CORE, AND ROTOR STRUCTURE

(71) Applicant: FANUC CORPORATION, Yamanashi (JP)

(72) Inventors: SeungJun Lee, Yamanashi (JP); Hidetoshi Uematsu, Yamanashi (JP); Makoto Funakubo, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 284 days.

(21) Appl. No.: 16/780,493

(22) Filed: Feb. 3, 2020

(65) Prior Publication Data

US 2020/0251943 A1 Aug. 6, 2020

(30) Foreign Application Priority Data

Feb. 5, 2019 (JP) .............................. JP2019-018604

(51) Int. Cl.
*H02K 1/276* (2022.01)
*H02K 15/12* (2006.01)
*H02K 15/03* (2006.01)

(52) U.S. Cl.
CPC ............. *H02K 1/276* (2013.01); *H02K 15/03* (2013.01); *H02K 15/12* (2013.01)

(58) Field of Classification Search
CPC ......... H02K 1/276; H02K 15/03; H02K 15/12
See application file for complete search history.

(56) References Cited

FOREIGN PATENT DOCUMENTS

| JP | 2001-157394 A | 6/2001 |
|---|---|---|
| JP | 2002-058184 A | 2/2002 |
| JP | 2008-271652 A | 11/2008 |
| JP | 2013-169103 A | 8/2013 |
| JP | 2014-046553 A | 3/2014 |
| JP | 2014-072906 A | 4/2014 |
| JP | 2014-220911 A | 11/2014 |

(Continued)

OTHER PUBLICATIONS

An Office Action; "Notice of Reasons for Refusal", mailed by the Japanese Patent Office dated Jun. 8, 2021, which corresponds to Japanese Patent Application No. 2019-018604 and is related to U.S. Appl. No. 16/780,493; with English language translation.

(Continued)

*Primary Examiner* — Carl J Arbes
(74) *Attorney, Agent, or Firm* — Studebaker & Brackett PC

(57) ABSTRACT

Provided is a device for manufacturing a rotor core with less magnetic flux leakage, a method for manufacturing the rotor core, and a rotor structure. Included are a first mold including a fitting recess that fits and holds a laminated iron core in which a magnet is inserted into a magnet insertion hole; a second mold that clamps and seals the laminated iron core together with the first mold; a resin injection unit that is provided to the second mold and injects a resin material in the magnet insertion hole by using a molding machine; and a protrusion that is inserted into the magnet insertion hole by a predetermined insertion amount, and positions and holds the magnet by an end of the magnet being brought into contact with the protrusion, in a state of the first mold and the second mold being clamped.

15 Claims, 7 Drawing Sheets

(56) References Cited

FOREIGN PATENT DOCUMENTS

| JP | 2015-100157 | A | | 5/2015 |
|----|-------------|---|---|--------|
| JP | 2016-082831 | A | * | 5/2016 |
| JP | 2016-152653 | A | * | 8/2016 |
| JP | 2017-022886 | A | | 1/2017 |
| JP | 6076288 | B | * | 2/2017 |
| JP | 2017-127070 | A | | 7/2017 |
| JP | 2017-163757 | A | | 9/2017 |
| JP | 6235968 | B | * | 11/2017 |
| JP | 2018-019465 | A | | 2/2018 |
| JP | 2018-201295 | A | * | 12/2018 |
| WO | 2012/026003 | A1 | | 3/2012 |
| WO | 20160147211 | A1 | | 9/2016 |

OTHER PUBLICATIONS

Reconsideration Report by Examiner before Appeal mailed by the Japanese Patent Office dated Feb. 15, 2022, which corresponds to Japanese Patent Application No. 2019-018604 and is related to U.S. Appl. No. 16/780,493; with English language translation.
"Notification of Reasons for Refusal" Office Action issued in JP 2019-018604; mailed by the Japanese Patent Office dated Jul. 12, 2022.

* cited by examiner

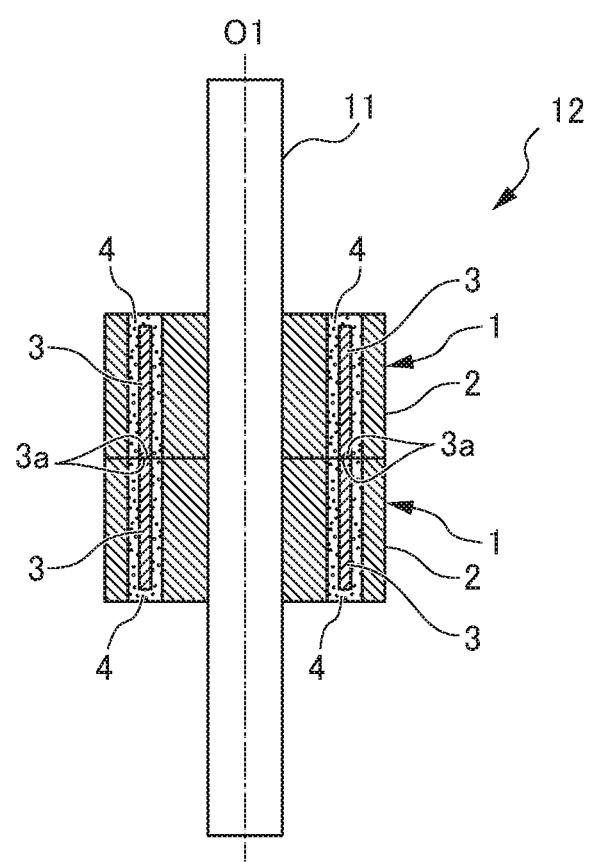

Device for Manufacturing Rotor Core, Method for Manufacturing Rotor Core, and Rotor Structure This application is based on and claims the benefit of priority from Japanese Patent Application No. 2019-018604, filed on 5 Feb. 2019, the content of which is incorporated herein by reference.

BACKGROUND OF THE INVENTION

Field of the Invention

The present invention relates to a device for manufacturing a rotor core, a method for manufacturing a rotor core, and a rotor structure.

Related Art

For example, a rotor (rotor structure) of an electric rotating machine, such as a motor of an automobile or an electric appliance, is configured such that a plurality of rotor cores is integrally combined in the axis line direction while inserting a shaft into a center hole (shaft hole) of each of the rotor cores. Furthermore, as the rotor core, an IPM-type rotor core (interior permanent magnet type rotor core) or an SPM-type rotor core (surface permanent magnet type rotor core) is frequently used.

For example, as shown in FIG. 2, the IPM-type rotor core 1 is configured to include: a laminated iron core 2 in which a plurality of core members (thin plate-shaped members) formed by punching an electromagnetic steel sheet is laminated, permanent magnets 3 that are each inserted into and accommodated in a magnet insertion hole 2c formed to penetrate from one end 2a to the other end 2b in an axis line O1 direction of the laminated iron core 2, and a resin material 4 for embedding and fixing the permanent magnets 3 by injecting the resin material 4 into the magnet insertion hole 2c.

For example, as shown in FIG. 3, the SPM-type rotor core 5 is configured to include a laminated iron core 2, permanent magnets 3 which are arranged at equal intervals in the circumferential direction on the outer peripheral surface side of the laminated iron core 2, a cylindrical exterior member 6 which surrounds and covers the laminated iron core 2 with the permanent magnets 3, and a resin material 4 for embedding and fixing the permanent magnets 3 by injecting the resin material 4 between the exterior member 6 and the laminated iron core 2.

A center hole (shaft hole) 2d that is formed to penetrate from one end 2a to the other end 2b on its axis line O1 and is used for fitting the shaft is provided in the laminated iron core 2.

On the other hand, for example, as shown in FIG. 9, a device for manufacturing the rotor cores 1 and 5 is configured to include: a first mold 7 having a fitting recess 7a that fits and holds the laminated iron core 2 mounted by inserting the permanent magnet 3 into the magnet insertion hole 2c (or a laminated iron core 5 to which the permanent magnet 3 and the exterior member 6 are mounted) in the axis line O1; a second mold 8 that is engaged with the first mold 7 and clamps/seals the laminated iron core 2 within a mold cavity with the first mold 7; and a resin injection unit 9 that is provided in the second mold 8 (or the first mold 7) and injects the resin material 4 in the magnet insertion hole 2c of the laminated iron core 2 within the mold cavity (or between the exterior member 6 and the laminated iron core 2) (for example, refer to Patent Document 1). When fitting the laminated iron core 2 in the fitting recess 7a, the first mold 7 is provided with a core rod 10 integrally for positioning and holding by being fit in the center hole (shaft hole) 2d.

When manufacturing the rotor cores 1 and 5, as shown in FIGS. 9 and 10, after clamping the first mold 7 and the second mold 8 and sealing the laminated iron core 2, as shown in FIG. 11, the resin material 4 is injected into the magnet insertion hole 2c from the resin injection unit 9 (or between the exterior member 6 and the laminated iron core 2) by using an injection molding machine. As shown in FIG. 12, the molds 7 and 8 are opened at the appropriate timing, thereby removing the rotor core 1 (5) by form removal. The rotor core 1 (5) in which the permanent magnet 3 is embedded and fixed by the resin material 4 is thereby manufactured.

Patent Document 1: Re-publication of WO2016/147211

SUMMARY OF THE INVENTION

However, in the manufacturing device for the conventional rotor cores 1 and 5 and the manufacturing method for the rotor cores 1 and 5 as shown in FIGS. 11 and 12, there is a case in which, by injecting the resin material 4 in the magnet insertion hole 2c from the resin injection unit 9 (or between the exterior member 6 and the laminated iron core 2) by using an injection molding machine, the permanent magnet 3 disposed in the magnet insertion hole 2c (or between the exterior member 6 and the laminated iron core 2) is pressed against the inner surface side of the first mold 7, and an end 3a of the permanent magnet 3 is exposed on the one end 2a side of the laminated iron core 2 (rotor core).

Then, as shown in FIG. 13, when manufacturing the rotor 12 by mounting a plurality of rotor cores 1(5) manufactured in this way to the shaft 11, there is a problem in that the ends 3a of the magnets 3 of the pair of rotor cores 1 adjacent to each other in the axis line O1 direction abut against each other and are brought into contact with each other, or adjoined to each other, a result of which magnetic flux leakage occurs at this portion. In particular, as shown in FIG. 13, there is inconvenience in that the magnetic flux leakage often occurs at the location where one of the rotor cores of the pairs of rotor cores 1 adjacent to each other is reversed and step-skewed, and the ends 3a of the magnets 3 are brought in contact with each other.

An aspect of a device for manufacturing a rotor core according to the present disclosure includes: a first mold including a fitting recess that fits and holds a laminated iron core in which a magnet is inserted into a magnet insertion hole or a laminated iron core in which a magnet and an exterior member are mounted on an outer circumferential side; a second mold that engages with the first mold and clamps and seals the laminated iron core together with the first mold; a resin injection unit that is provided to the first mold or the second mold and injects a resin material in the magnet insertion hole or between the exterior member and the laminated iron core by using a molding machine; and a protrusion that is inserted into the magnet insertion hole or between the exterior member and the laminated iron core by a predetermined insertion amount, and positions and holds the magnet by an end of the magnet being brought into contact with the protrusion, in a state of the first mold and the second mold being clamped.

An aspect of a method for manufacturing a rotor core according to the present disclosure includes: a first mold mounting step of inserting a protrusion by a predetermined insertion amount into a magnet insertion hole that penetrates from one end to an other end in an axis line direction of a laminated iron core in which a magnet is inserted into a magnet insertion hole, or between a laminated iron core in which a magnet and an exterior member are mounted on an outer circumferential side and the exterior member, and fitting and arranging the laminated iron core in a fitting recess of a first mold from a side of the one end; a second mold mounting step of engaging a second mold with the first mold, and clamping and sealing the laminated iron core together with the first mold; and a resin injecting step of injecting a resin material into the magnet insertion hole or between the exterior member and the laminated iron core through a resin injection unit provided in the first mold or the second mold.

An aspect of a rotor structure according to the present disclosure is a rotor structure provided by integrally combining a plurality of rotor cores manufactured by using the device for manufacturing the rotor core according to the abovementioned aspect, or by method for manufacturing the rotor core, in an axis line direction while inserting a shaft into a center hole of the rotor core, in which, among at least some pairs of rotor cores that are adjacent in the axis line direction, one of the rotor cores is reversed and step-skewed.

In the abovementioned aspect, the resin material is injected in a state in which the protrusion is inserted by a predetermined insertion amount into the magnet insertion hole, or between the laminated iron core in which the magnet and the exterior member are mounted on the outer circumferential side and the exterior member. Therefore, it is possible to arrange the end of the magnet in the axis line direction inwardly from the end of the laminated iron core (rotor core) by an amount corresponding to the insertion amount of the protrusion.

With such a configuration, when mounting a plurality of rotor cores to the shaft, and when one of the adjacent rotor cores is reversed and step-skewed, it becomes possible for the ends of the magnetics of the adjacent rotor cores to be arranged away from each other.

Accordingly, it becomes possible to eliminate the inconvenience in that the magnetic flux leakage occurs at this portion where the ends of the magnets of the pair of rotor cores adjacent to each other in the axis line direction abut against each other and are brought into contact or adjoined with each other conventionally. In other words, it becomes possible to realize a high-performance rotor (rotor structure).

BRIEF DESCRIPTION OF THE DRAWINGS

FIG. 13 is a cross-sectional view showing a conventional rotor (rotor structure).

DETAILED DESCRIPTION OF THE INVENTION

Hereinafter, with reference to FIGS. 1 to 8, a description will be given of a device for manufacturing a rotor core, a method for manufacturing a rotor core, and a rotor structure.

Figure 1:
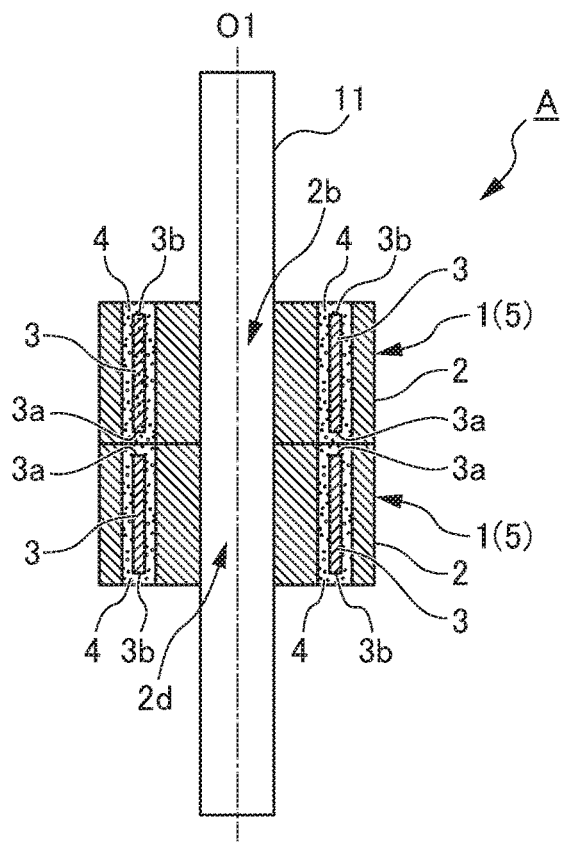
FIG. 1 is a cross-sectional view showing a rotor (rotor structure) of an embodiment.

As shown in FIG. 1, a rotor structure (rotor) A of the present embodiment (rotor) is, for example, a rotor of an electric rotating machine such as a motor of an automobile or an electric appliance, and is configured such that a plurality of rotor cores 1(5) of the present embodiment is integrally mounted by inserting a shaft 11 into a center hole (shaft hole) 2d that is formed to be penetrated around the axis line O1, and combined on the same axis.

Here, in the present embodiment, the rotor core 1 will be described as an IPM-type rotor core (interior permanent magnet type rotor core).

Figure 2:
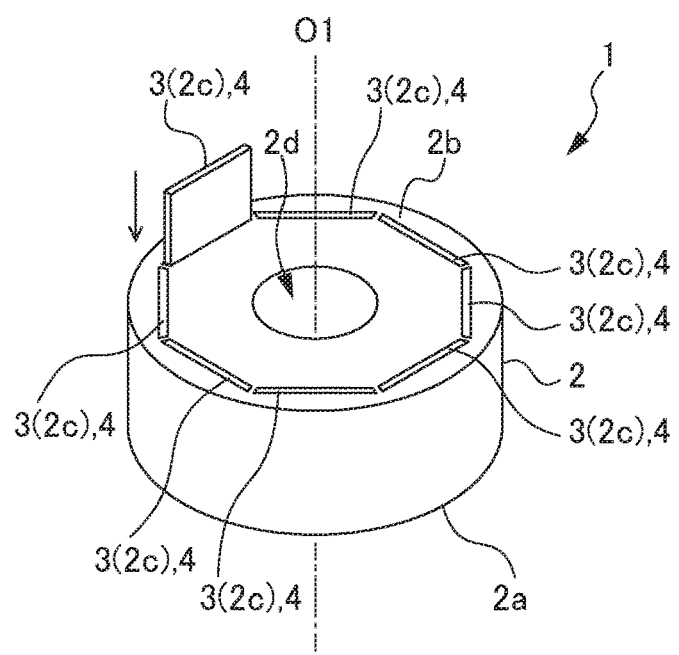
FIG. 2 is a perspective view showing a rotor core (an IPM-type rotor core) of one embodiment.

For example, as shown in FIGS. 1 and 2, the rotor core 1 of the present embodiment includes: a laminated iron core (core) 2 in which a plurality of core members (thin plate-shaped members) formed by punching an electromagnetic steel sheet is laminated; permanent magnets (magnets) 3 that are each inserted into and arranged in a magnet insertion hole 2c formed to penetrate from one end 2a to the other end 2b in an axis line O1 direction of the laminated iron core 2; and a resin material 4 for embedding and fixing the permanent magnet 3 by injecting the resin material 4 into the magnet insertion hole 2c.

Figure 4:
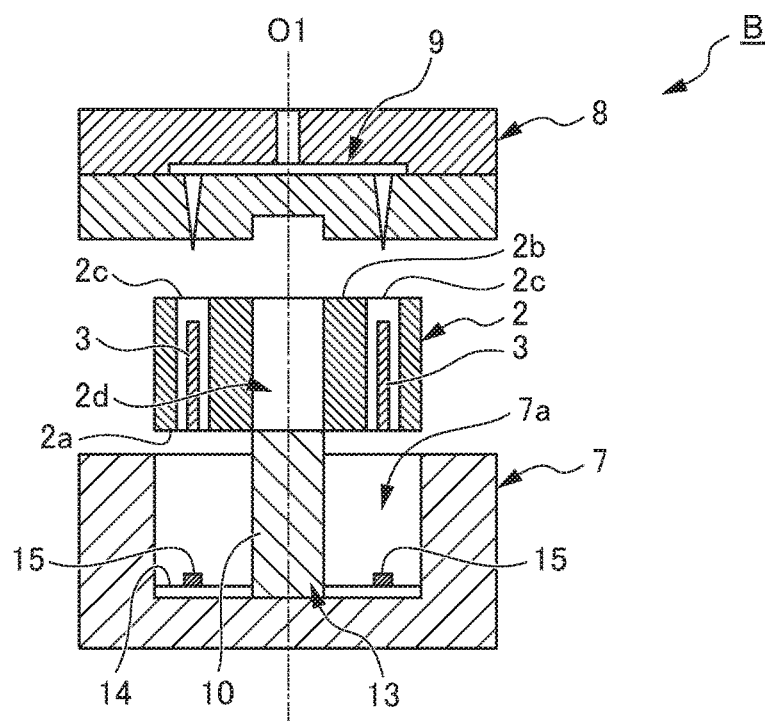
FIG. 4 is a cross-sectional view showing a manufacturing device and a manufacturing method for a rotor core (an IPM-type rotor core) of one embodiment.
Figure 5:
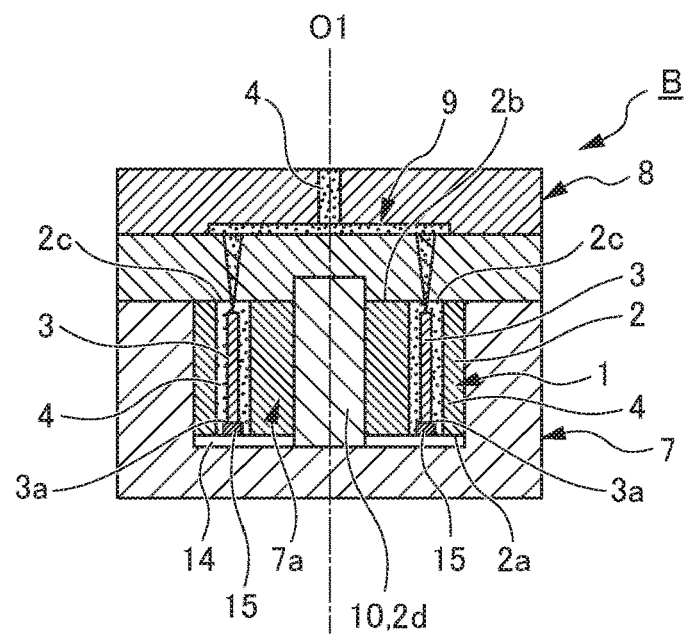
FIG. 5 is a cross-sectional view showing a manufacturing device and a manufacturing method for a rotor core (an IPM-type rotor core) of one embodiment.

As illustrated in FIGS. 4 and 5, a device B for manufacturing the rotor core 1 (a manufacturing device for a rotor core) of the present embodiment including the abovementioned configuration includes: a first mold 7 having a fitting recess 7a that fits and holds the laminated iron core 2 in which the permanent magnet 3 is inserted into the magnet insertion hole 2c, and a columnar core rod 10 that is fit in the center hole 2d formed to penetrate in the axis line O1 of the laminated iron core 2; a second mold 8 that is engaged with the first mold 7 and clamps and seals the laminated iron core 2 together with the first mold 7; a resin injection unit 9 that is provided in the second mold 8 and injects a resin material 4 in the magnet insertion hole 2c by using an injection molding machine; and a manufacturing jig 14 that has a through hole 13 into which the core rod 10 is to be inserted centered on the axis line O1, and provided between an inner surface of the first mold 7 and one end (an end) 2a in the axis line O1 direction on the first mold 7 side of the laminated iron core 2 in a state in which the first mold 7 and the second mold 8 are clamped.

Furthermore, the manufacturing jig 14 is not particularly limited, and for example, is composed of stainless steel, aluminum, or the like. The manufacturing jig 14 is formed to include a protrusion 15 that is inserted into the magnet insertion hole 2c by a predetermined insertion amount, and positions and holds the permanent magnet 3 by an end 3a of the permanent magnet 3 being brought into contact with the protrusion 15 in a state in which the first mold 7 and the second mold 8 are clamped.

The resin material 4 is delivered to the resin injection unit 9 provided in the second mold 8 from an injection molding machine, and the resin injection unit 9 includes a resin flow channel through which the resin material 4 is delivered and injected to the magnet insertion hole 2c of the laminated iron core 2 clamped by the first mold 7 and the second mold 8.

Next, a description will be given of a method for manufacturing a rotor core 1 by using a manufacturing device B for the rotor core 1 of the present embodiment including the above configuration (a method for integrally embedding and fixing the permanent magnet 3 to the laminated iron core 2 by injecting the resin material 4).

In the manufacturing method for the rotor core of the present embodiment, as shown in FIGS. 4 and 5, the core rod 10 of the first mold 7 is inserted into the center hole 2d of the laminated iron core 2 from the through hole 13 of the manufacturing jig 14, thereby fitting and arranging the laminated iron core 2 (and the manufacturing jig 14) (first mold mounting step).

At this time, for example, the manufacturing jig 14 is installed in advance in the fitting recess 7a of the first mold 7. With such a configuration, the laminated iron core 2 is fit and arranged in the fitting recess 7a of the first mold 7, and the manufacturing jig 14 is provided between the inner surface of the first mold 7 and the one end 2a of the laminated iron core 2.

Furthermore, the laminated iron core 2 is fit and arranged in the fitting recess 7a of the first mold 7, and the protrusion 15 provided in the manufacturing jig 14 is inserted into the magnet insertion hole 2c of the laminated iron core 2 from the one end 2a by a predetermined insertion amount.

Next, as shown in FIG. 5, the second mold 8 is engaged with the first mold 7, thereby clamping and sealing the laminated iron core 2 together with the first mold 7 (second mold mounting step).

Thereafter, the resin material 4 is injected to the magnet insertion hole 2c by an injection molding machine through the resin injection unit 9 provided in the second mold 8 (resin injecting step).

Figure 6:
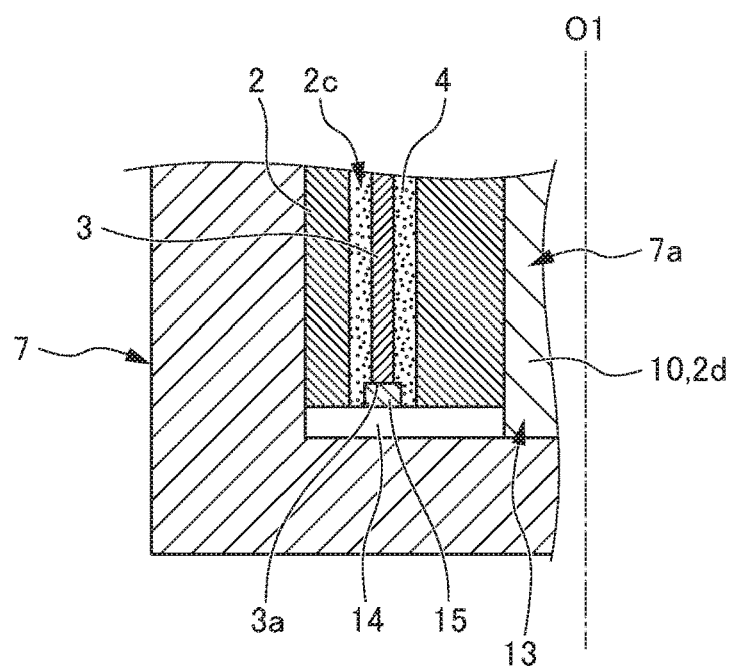
FIG. 6 is an enlarged view showing a manufacturing jig and a protrusion of a manufacturing device for a rotor core (an IPM-type rotor core) of one embodiment.

At this time, as shown in FIGS. 5 and 6, the resin material 4 is inserted from the other end 2b side of the magnet insertion hole 2c, and the permanent magnet 3 inside the magnet insertion hole 2c is pressed against the protrusion 15, and thus, the end 3a of the permanent magnet 3 abuts with the protrusion 15, thereby positioning and holding the permanent magnet 3.

Figure 7:
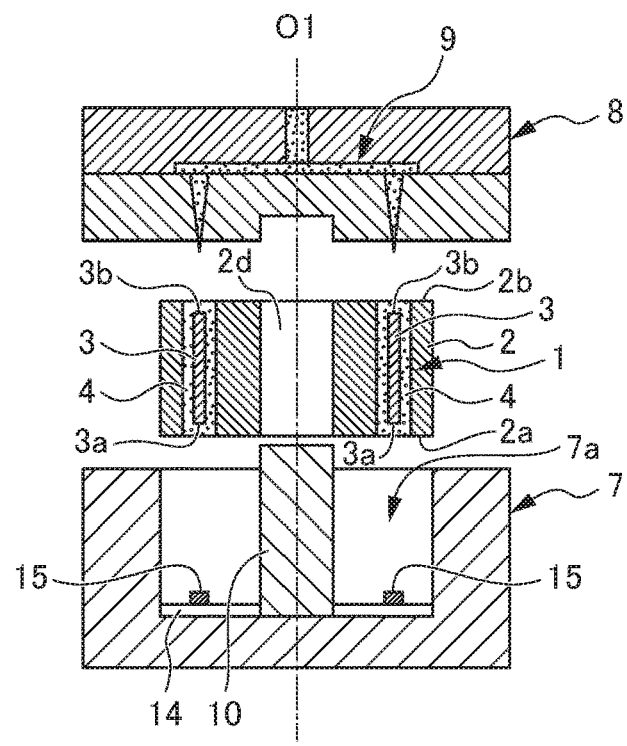
FIG. 7 is a cross-sectional view showing a manufacturing device and a manufacturing method for a rotor core (an-IPM type rotor core) of one embodiment.

Next, as shown in FIG. 7, the molds 7 and 8 are opened at the appropriate timing, and the rotor core 1 is removed by form removal. Thus, the protrusion 15 is also withdrawn from the interior of the magnet insertion hole 2c, and the permanent magnet 3 is spaced apart in the axis line O1 direction by a predetermined amount from the one end 2a of the laminated iron core 2, whereby the rotor core 1 that is embedded and fixed by the resin material 4 is manufactured. It should be noted that the manufacturing jig 14 is adopted to manufacture another rotor core 1.

Here, as shown in FIG. 7 (FIG. 1), if the dimension obtained by adding the protrusion amount of the protrusion 15 to the length along the axis line O1 direction of the permanent magnet 3 is made smaller than the length dimension along the axis line O1 direction of the magnet insertion hole 2c, it is possible for one end of the permanent magnet 3 to be spaced apart from the one end 2a of the laminated iron core 2 by the protrusion 15, and the rotor core 1 is formed in such a manner that the other end 3b of the permanent magnet 3 is spaced apart from the other end 2b of the laminated iron core 2.

Figure 8:
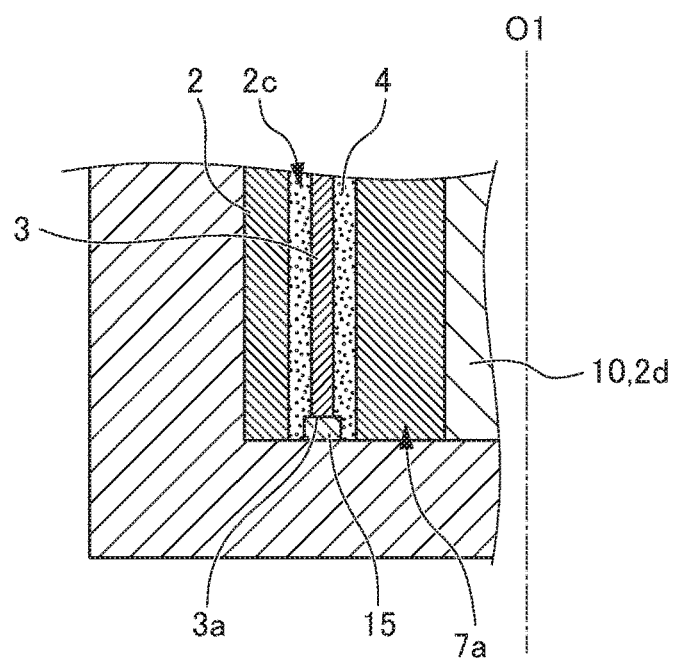
FIG. 8 is a cross-sectional view showing a modified example of a manufacturing device and a manufacturing method for a rotor core (an IPM-type rotor core) of one embodiment, and an enlarged view showing a protrusion.
Figure 9:
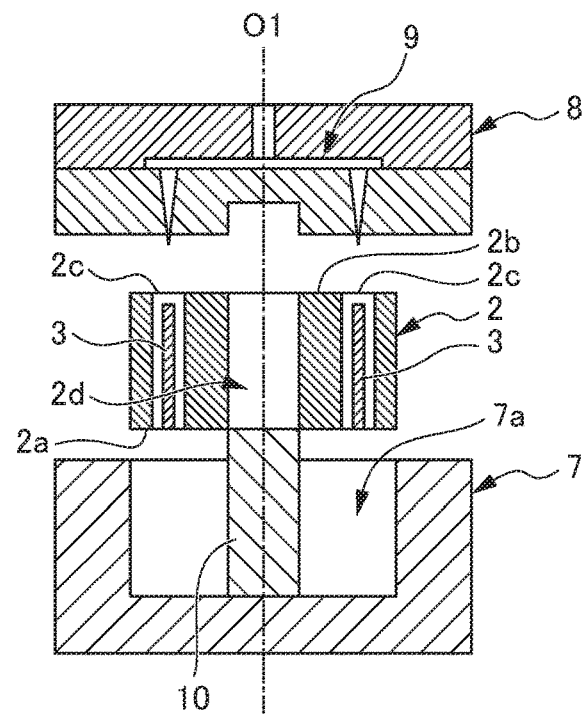
FIG. 9 is a cross-sectional view showing a manufacturing device and a manufacturing method for a conventional rotor core (an IPM-type rotor core)
Figure 10:
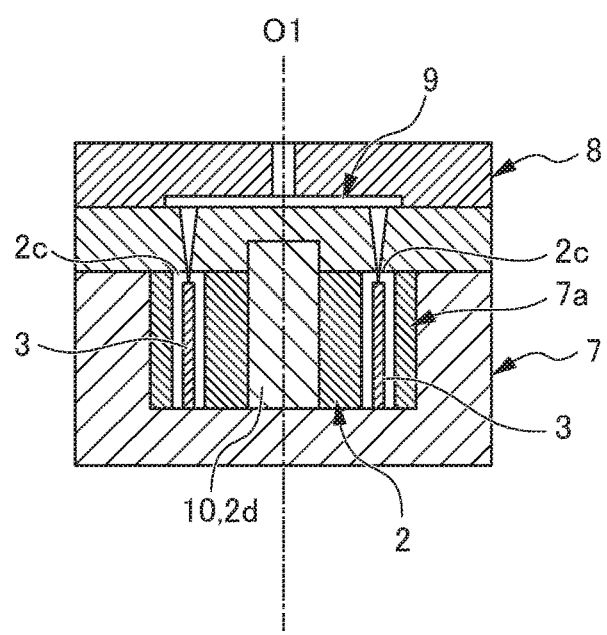
FIG. 10 is a cross-sectional view showing a manufacturing device and a manufacturing method for a conventional rotor core (an IPM-type rotor core)
Figure 11:
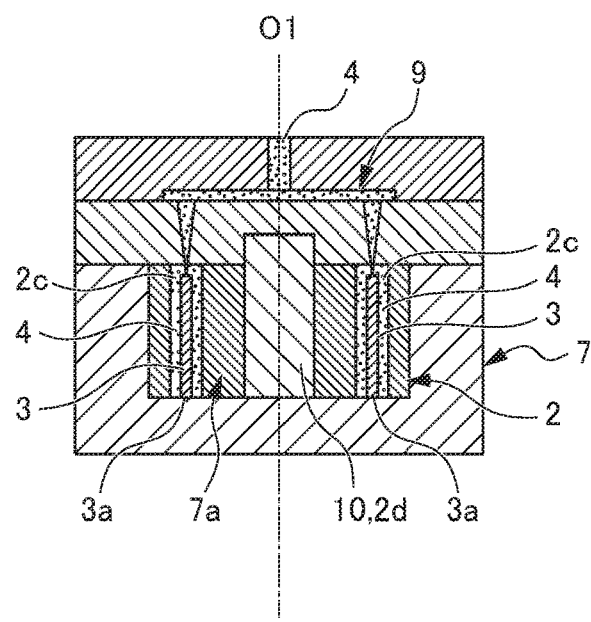
FIG. 11 is a cross-sectional view showing a manufacturing device and a manufacturing method for a conventional rotor core (an IPM-type rotor core)
Figure 12:
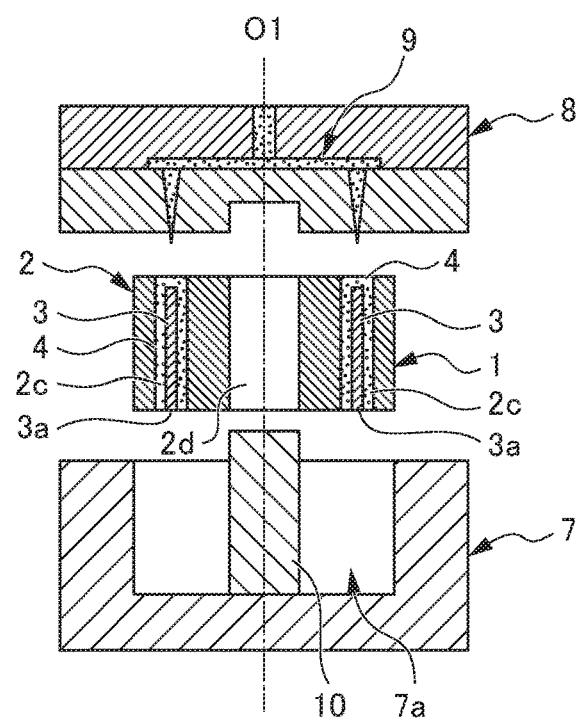
FIG. 12 is a cross-sectional view showing a manufacturing device and a manufacturing method for a conventional rotor core (an IPM-type rotor core)

Furthermore, as shown in FIG. 8, the protrusion 15 may be provided on the inner surface of the first mold 7, rather than in the manufacturing jig 14. In this case, it suffices if the laminated iron core 2 is fit to the fitting recess 7a from the one end 2a side, and the protrusion 15 of the first mold 7 is configured to be inserted into the magnet insertion hole 2c of the laminated iron core 2 without using the manufacturing jig 14. In this case as well, similarly to the above, the end of the permanent magnet 3 can be spaced apart by a predetermined amount in the axis line O1 direction from the one end 2a of the laminated iron core 2.

Furthermore, the protrusion 15 may be provided so that the protrusion amount and the insertion amount into the magnet insertion hole 2c are adjustable by providing the protrusion 15 so as to be slidably moved in the axis line O1 direction. In this case, it is possible to freely adjust the spacing amount from the permanent magnet 3 and the end 2a of the laminated iron core 2. Furthermore, in this case, for example, in a case of employing a small permanent magnet 3 having strong magnetic force and a large permanent magnet 3 having less magnetic force than that of the small permanent magnet 3 (in a case of achieving torque increasing efficiently by using the permanent magnets 3 having different magnetic forces), it is possible to fit the sizes of the respective permanent magnets 3 by adjusting the protrusion amount of the protrusion 15, thereby adjusting the arrangement suitably and easily.

Then, as shown in FIG. 1, when configuring the rotor (rotor structure) A by mounting a plurality of rotor cores 1 manufactured as described above to the shaft 11, since the ends 3a(3b) of the permanent magnets 3 from each of the ends of the rotor cores 1 are spaced apart in the axis line O1 direction inwardly, it is possible to eliminate the inconvenience in that the ends 3a of the magnets 3 of the pair of rotor cores 1 adjacent to each other in the axis line O1 direction abut against each other and are brought into contact with each other, or adjoin each other conventionally, leading to magnetic flux leakage at this portion. That is, it becomes possible to realize a high-performance rotor A.

Furthermore, it is also possible to prevent damage such as cracking in the permanent magnet 3 due to abutting against each other of the ends 3a(3b) of the magnets 3 of the pair of adjacent rotor cores 1.

As described above, the description has been given of the manufacturing device for the rotor core, the manufacturing method for the rotor core, and the rotor structure; however, the present invention is not limited to one embodiment described above, and can be modified to the extent that does not deviate from the gist of the present invention.

For example, in the present embodiment, the rotor core has been described as an IPM-type rotor core (interior permanent magnet type rotor core); however, it may be an SPM-type rotor core (surface permanent magnet type rotor core).

Figure 3:
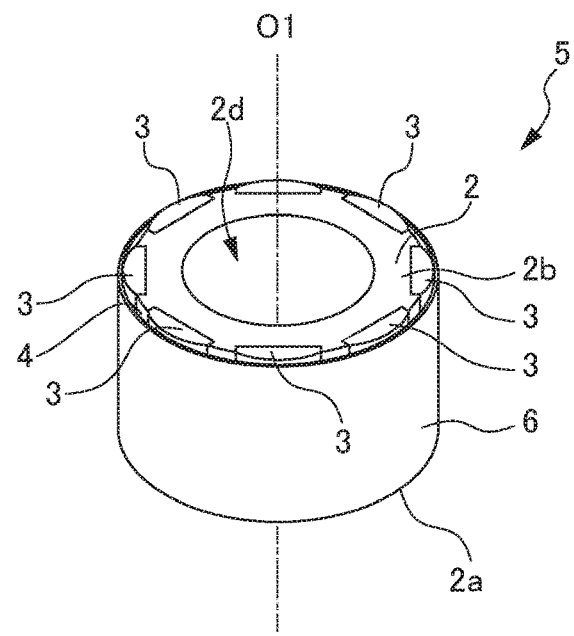
FIG. 3 is a perspective view showing a rotor core (an SPM-type rotor core) of one embodiment.

More specifically, as shown in FIG. 3, for example, the SPM-type rotor core 5 includes the laminated iron core 2, the permanent magnets 3 which are arranged at equal intervals in the circumferential direction on the outer peripheral surface side of the laminated iron core 2, the cylindrical exterior member 6 which surrounds and covers the laminated iron core 2 with the permanent magnets 3, and the resin material 4 for embedding and fixing the permanent magnets 3 by injecting the resin material 4 between the exterior member 6 and the laminated iron core 2.

When manufacturing the SPM-type rotor core 5, the protrusion 15 is inserted between the exterior member 6 and the rotor core 5 and, while the permanent magnet 3 between the exterior member 6 and the laminated iron core 2 is positioned by means of the protrusion 15, the permanent magnet 3 is embedded and fixed using a molding machine by injecting from the resin injection unit 9 between the exterior member 6 and the laminated iron core 2. With such a configuration, it is possible to obtain the same operational effect as that of the present embodiment.

EXPLANATION OF REFERENCE NUMERALS

1 IPM-type rotor core (rotor core)
2 laminated iron core
2*a* one end
2*b* other end
2*c* magnet insertion hole
2*d* center hole (shaft hole)
3 permanent magnet (magnet)
3*a* one end (end)
3*b* other end (end)
4 resin material
5 SPM-type rotor core (rotor core)
6 exterior member
7 first mold
7*a* fitting recess
8 second mold
9 resin injection unit
10 core rod
11 shaft
13 through hole
14 manufacturing jig
15 protrusion
A rotor (rotor structure)
B manufacturing device for rotor core
O1 axis line

What is claimed is:

1. A device for manufacturing a rotor core, the device comprising:
    a first mold including a fitting recess that fits and holds a laminated iron core in which a magnet is inserted into a magnet insertion hole or a laminated iron core in which a magnet and an exterior member are mounted on an outer circumferential side;
    a second mold that engages with the first mold and clamps and seals the laminated iron core together with the first mold;
    a resin injection unit that is provided to the first mold or the second mold and injects a resin material in the magnet insertion hole or between the exterior member and the laminated iron core by using a molding machine; and
    a protrusion that is inserted into the magnet insertion hole or between the exterior member and the laminated iron core by a predetermined insertion amount, and positions and holds the magnet by an end of the magnet being brought into contact with the protrusion, in a state of the first mold and the second mold being clamped,
    wherein the protrusion and the magnet are sized such that one end of the magnet is spaced apart from one end of the magnet insertion hole or laminated iron core by the protrusion and an opposite end of the magnet is spaced apart from an opposite end of the magnet insertion hole or laminated iron core.

2. The device for manufacturing the rotor core according to claim 1, wherein the protrusion is provided to a manufacturing jig that is provided between an inner surface of either one of the first mold and the second mold and an end in an axis line direction of the laminated iron core in a clamped state, or provided to the mold.

3. The device for manufacturing the rotor core according to claim 1, wherein the protrusion is provided such that an insertion amount into the magnet insertion hole or between the exterior member and the laminated iron core is adjustable.

4. The device for manufacturing the rotor core according to claim 2, wherein the protrusion is provided_such that an insertion amount into the magnet insertion hole or between the exterior member and the laminated iron core is adjustable.

5. A method for manufacturing a rotor core, the method comprising:
    a first mold mounting step of inserting a protrusion by a predetermined insertion amount into a magnet insertion hole that penetrates from one end to an other end in an axis line direction of a laminated iron core in which a magnet is inserted into a magnet insertion hole, or between a laminated iron core in which a magnet and an exterior member are mounted on an outer circumferential side and the exterior member, and fitting and arranging the laminated iron core in a fitting recess of a first mold from a side of the one end;
    a second mold mounting step of engaging a second mold with the first mold, and clamping and sealing the laminated iron core together with the first mold; and
    a resin injecting step of injecting a resin material into the magnet insertion hole or between the exterior member and the laminated iron core through a resin injection unit provided in the first mold or the second mold,
    wherein the protrusion and the magnet are sized such that one end of the magnet is spaced apart from one end of the magnet insertion hole or laminated iron core by the protrusion and an opposite end of the magnet is spaced apart from an opposite end of the magnet insertion hole or laminated iron core.

6. The method for manufacturing the rotor core according to claim 5, wherein the laminated iron core is fit in the fitting recess of the first mold, a manufacturing jig provided with the protrusion is provided between an inner surface of the first mold and the one end of the laminated iron core, and the protrusion is inserted by a predetermined insertion amount into the magnet insertion hole or between the exterior member and the laminated iron core.

7. The method for manufacturing the rotor core according to claim 5, wherein
    the protrusion is provided to the first mold, and
    the laminated iron core is fit in the fitting recess of the first mold, and the protrusion is inserted by a predetermined insertion amount into the magnet insertion hole or between the exterior member and the laminated iron core.

8. A rotor structure provided by integrally combining a plurality of rotor cores manufactured by using the device for manufacturing the rotor core according to claim 1 in an axis line direction while inserting a shaft into a center hole of the rotor core, wherein, among at least some pairs of rotor cores that are adjacent in the axis line direction, one of the rotor cores is reversed and step-skewed.

9. A rotor structure provided by integrally combining a plurality of rotor cores manufactured by using the device for manufacturing the rotor core according to claim 2 in an axis line direction while inserting a shaft into a center hole of the rotor core,
wherein, among at least some pairs of rotor cores that are adjacent in the axis line direction, one of the rotor cores is reversed and step-skewed.

10. A rotor structure provided by integrally combining a plurality of rotor cores manufactured by using the device for manufacturing the rotor core according to claim 3 in an axis line direction while inserting a shaft into a center hole of the rotor core,
wherein, among at least some pairs of rotor cores that are adjacent in the axis line direction, one of the rotor cores is reversed and step-skewed.

11. A rotor structure provided by integrally combining a plurality of rotor cores manufactured by using the device for manufacturing the rotor core according to claim 4 in an axis line direction while inserting a shaft into a center hole of the rotor core,
wherein, among at least some pairs of rotor cores that are adjacent in the axis line direction, one of the rotor cores is reversed and step-skewed.

12. A rotor structure provided by integrally combining a plurality of rotor cores manufactured by using the device for manufacturing the rotor core according to claim 5 in an axis line direction while inserting a shaft into a center hole of the rotor core,
wherein, among at least some pairs of rotor cores that are adjacent in the axis line direction, one of the rotor cores is reversed and step-skewed.

13. A rotor structure provided by integrally combining a plurality of rotor cores manufactured by using the device for manufacturing the rotor core according to claim 6 in an axis line direction while inserting a shaft into a center hole of the rotor core,
wherein, among at least some pairs of rotor cores that are adjacent in the axis line direction, one of the rotor cores is reversed and step-skewed.

14. A rotor structure provided by integrally combining a plurality of rotor cores manufactured by using the device for manufacturing the rotor core according to claim 7 in an axis line direction while inserting a shaft into a center hole of the rotor core,
wherein, among at least some pairs of rotor cores that are adjacent in the axis line direction, one of the rotor cores is reversed and step-skewed.

15. A rotor structure provided by integrally combining a plurality of rotor cores manufactured by using the device for manufacturing the rotor core according to claim 8 in an axis line direction while inserting a shaft into a center hole of the rotor core,
wherein, among at least some pairs of rotor cores that are adjacent in the axis line direction, one of the rotor cores is reversed and step-skewed.

* * * * *